United States Patent [19]

Latreyte

[11] Patent Number: 4,785,729
[45] Date of Patent: Nov. 22, 1988

[54] PRODUCE PEELING MACHINE, PARTICULARLY FOR SHELLING NUTS

[76] Inventor: Suzanne Latreyte, 5 avenue de Villeneuve, Saint-Sylvestre-Sur-Lot, 47140 Penne D'Agenais, France

[21] Appl. No.: 4,566

[22] Filed: Jan. 20, 1987

[30] Foreign Application Priority Data

Jan. 22, 1986 [FR] France .................... 86 00888

[51] Int. Cl.⁴ .................................... A23N 7/00
[52] U.S. Cl. ......................... 99/536; 99/541; 99/584; 99/623; 99/631
[58] Field of Search .............. 99/516, 517, 485, 495, 99/518, 540, 541, 584, 623, 630–633, 534–536; 366/169

[56] References Cited

U.S. PATENT DOCUMENTS

| 856,037 | 6/1907 | Delpire | 99/631 |
|---|---|---|---|
| 2,286,352 | 6/1942 | Eakins | 99/633 |
| 2,642,107 | 6/1953 | Edmonds | 99/633 |
| 3,266,540 | 8/1966 | Bradham | 99/633 X |
| 3,677,314 | 7/1972 | Plana | 99/540 |
| 4,442,764 | 4/1984 | Bos et al. | 99/633 |
| 4,521,380 | 6/1985 | Fujimoto | 366/169 X |
| 4,628,807 | 12/1986 | Dopp | 99/516 X |

FOREIGN PATENT DOCUMENTS 2558690  1/1984  France .

Primary Examiner—Timothy F. Simone
Attorney, Agent, or Firm—Harold H. Dutton, Jr.

[57] ABSTRACT

The invention concerns a machine for treating produce for peeling it, in particular a nut-husking machine. This machine comprises a tank (1) with a cylindrical wall, a rotary disk (10) dotted with a plurality of teeth (16) projecting above the disk by an adjustable height, means (4–9) for driving the disk into rotation, a sliding gate (24) to recover the processed produce, means for evacuating the wastes and liquid that include a passage (15) on the disk circumference, a ring (21) in this passage and a bottom (2) associated with a spout (3), and means distributing the liquid which include a distributor (12) fixed to the center of the disk (10) in order to eject the liquid at the disk in the centrifugal direction.

14 Claims, 4 Drawing Sheets

PRODUCE PEELING MACHINE, PARTICULARLY FOR SHELLING NUTS

The invention relates to a machine for processing produce, for instance agricultural products, for peeling them. In particular, the invention applies to husking or shelling nuts, though it may also be used to peel other produce: fruit (oranges, quinces, kiwis), tubers (potatoes, carrots . . . ).

The invention provides a machine of the type in which the peeling is carried out by paring in the presence of water.

BACKGROUND AND OBJECTS OF THE INVENTION

The machines peeling in the presence of water generally have a structure such as is disclosed in the French patent No. 2,558,690 of Jan. 24, 1984. These machines comprise a tank into which discharges a sprinkler nozzle and which is lined with an abrasive material; a rotary disk sets the produce in rotation and makes the produce impact the abrasive wall of the tank, whereby material is removed. In some machines, the abrasive lining of the cylindrical wall is replaced by stiff bristle brushes.

However the effectiveness of such machines is mediocre, in particular when shelling nuts. Accordingly processing time is long (several tens of minutes), and shell pieces often remain attached to the produce, generally requiring another pass. Moreover such machines gradually load up with wastes and must be frequently rinsed lest the effectiveness drop further. Also these machines use significant quantities of water and therefore discharge large amounts of effluents. It should also be noted that these machines tend give rise to water jets, such that the tank must be closed at the top, and loading the produce is made more laborious.

The present invention proposes to provide an improved machine that peels by paring in the presence of water.

An essential object of the invention is to provide a machine with an efficiency substantially higher than that of the known machines.

Another object is to provide a machine less susceptible to clogging.

Another object is to reduce substantially the water consumption.

Another object is to provide a machine of which the upper side may remain open to facilitate loading the produce.

(Hereafter, the expressions relating to spatial positioning such as "high", "low" . . . shall refer to the normal operating position of the machine.)

DESCRIPTION OF THE INVENTION

The machine of the invention comprises a tank, a rotary disk near the bottom of this tank, rotary drive means for this disk, means for distributing the liquid in the tank, means for recovering the processed produce and means for evacuating the wastes and the liquid that include a passage in the disk circumference between this disk and the tank. According to the present invention: the liquid-distributing means comprises a distributor at the center of the disk and provided with orifices arranged to eject the liquid near the disk in the centrifugal direction, the rotary disk is dotted with a plurality of teeth projecting from the disk.

Preferably the tank is equipped with a smooth or substantially smooth cylindrical wall of which the sole function is to repel the produce toward the rotary disk.

In the machine of the invention, the toothed structure of the rotary disk and the water jet projected tangential to it cooperate to determine a novel operation which comprises removing material in the presence of water solely at the disk and in accelerating the motion and the mixing of the produce in the upper tank zones (particularly due to the smooth walls and the small quantities of water in these zones). Experiments have shown that machine performance is substantially increased compared to the known machine both with regard to the required processing times and the quality of peeling (which is complete). For example, a machine having a tank with a diameter of about 57 cm and a height of 65 cm can husk to completion 40 kg of nuts a minute whereas the best known machines of similar size require 12 minutes to process the same amount. Moreover water consumption is reduced in the machine of the invention by a factor of 1 to 13 relative to the known machines.

In a preferred embodiment, the liquid distributor is fastened to the center of the rotary disk so as to rotate with it and is connected to a liquid intake conduit by means of a rotary hydraulic joint. As will be more clearly seen below, it is possible in this manner to direct, in an accurate and optimal manner, the water jets issuing from the rotary disk.

Moreover the teeth rising from the rotary disk are preferably located in height-adjustable manner within apertures in the disk and are supported on adjusting means so as to control the height by which they project above the disk. In this manner the invention enables adjusting the clipping or paring ability of the teeth in relation to the nature or condition of the produce to be processed.

In another feature of the invention, the means for evacuating the wastes and the liquid comprise at least one ring located within the passage from the tank to the disk so as to divide this passage into at least two parts, each of a thickness less than that of the produce being processed. As will be more clearly seen below, such an arrangement permits evacuating the wastes while increasing the mixing of the produce.

DESCRIPTION OF THE DRAWINGS

The invention having been described generally, other features, purposes and advantages will become apparent from the description which follows in relation to the attached drawings, illustratively and without implying restriction, showing one embodiment and variations; in these drawings.

DESCRIPTION OF PREFERRED EMBODIMENTS

Figure 1:
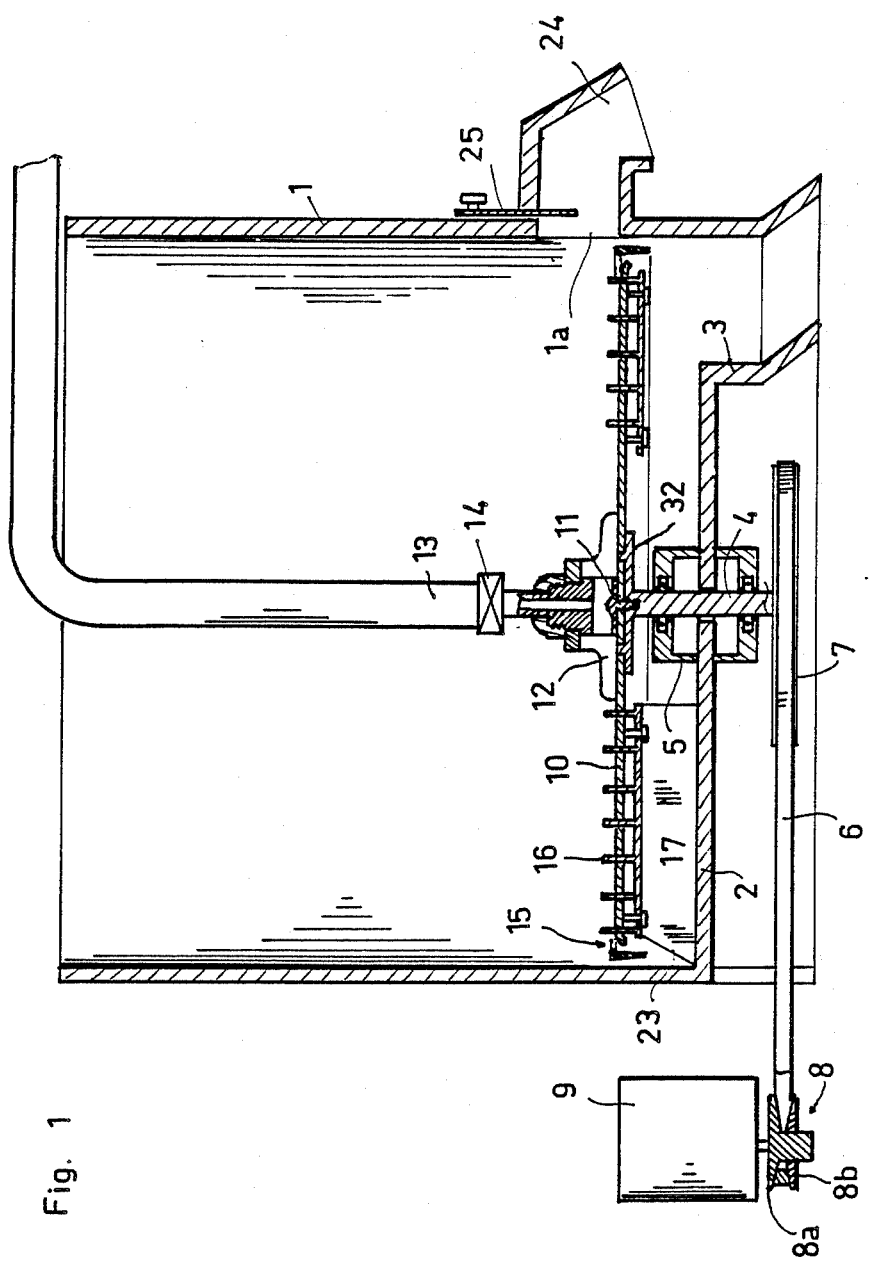
FIG. 1 is an axial vertical sectional view of a machine of the invention.

The illustratively shown machine of FIGS. 1 through 4 in particular is meant to husk nuts. It comprises a cylindrical tank 1 with a smooth cylindrical wall. This wall has an opening 1a extending to the outside by a produce discharge spout 24. A sliding gate 25 mounted on the tank allows sealing the opening 1a.

The tank 1 has a bottom 2 extending over its entire cross-section and on one side is equipped with an opening through which passes a spout 3 for the wastes and liquid.

In this example, the bottom 2 is planar and supports a vertical axial shaft 4 by means of sealed ball bearings symbolically shown at 5.

The shaft 4 may be driven into rotation by motor means which in the example comprises a V-belt 6 engaging the grooves of two pulleys 7 and 8 respectively mounted on the shaft 4 and the shaft of the electric motor 9. In the application described in this example, the motor 9 and the transmission means 6, 7, 8 are adapted to drive the shaft 4 at an angular speed between 250 and 400 rpm. Within this range, the speed may be optimally adjusted by setting the pulley 8.

To that end, this pulley 8 comprises a fixed side 8a solidly joined to the pulley hub and of a movable side 8b that can be screwed onto the hub to be closer to or farther from the movable side. A key is provided to lock the movable side into the selected position. In this manner it is possible to vary the transmission reduction factor.

The shaft 4 is solidly joined opposite the pulley 7 to a platform 32 extending horizontally at the center of the tank. A rotary disk 10 is assembled to this platform and rests on it so that the upper side of the disk is substantially at the same level as the lower edge of the tank opening 1a. Platform studs 32a enter conjugate holes in the disk 10 to eliminate any possible relative rotation between these elements.

In this example, assembly is carried out using a screw 11 tightened into the shaft 4 and solidly joined at the opposite end to a liquid distributor 12 which constitutes the head of the screw 11.

Accordingly the disk 10 is clamped between the platform 32 and the distributor 12 (which rotates with the unit). This distributor receives a liquid flow (water) from a fixed intake conduit 13 through a hydraulic rotary joint 14 shown in FIG. 1 and of conventional type. The movable output 14a of the rotary joint is held by the distributor 12 by means of connector end 14b and a nut 15. The intake conduit 13 extends upward along the tank axis.

The distributor 12 comprises feed orifices, for instance two diametrically opposite ones 12a located above the disk in the immediate vicinity of its upper surface in order to eject the liquid at the disk 10 in the centrifugal direction.

Figure 4:
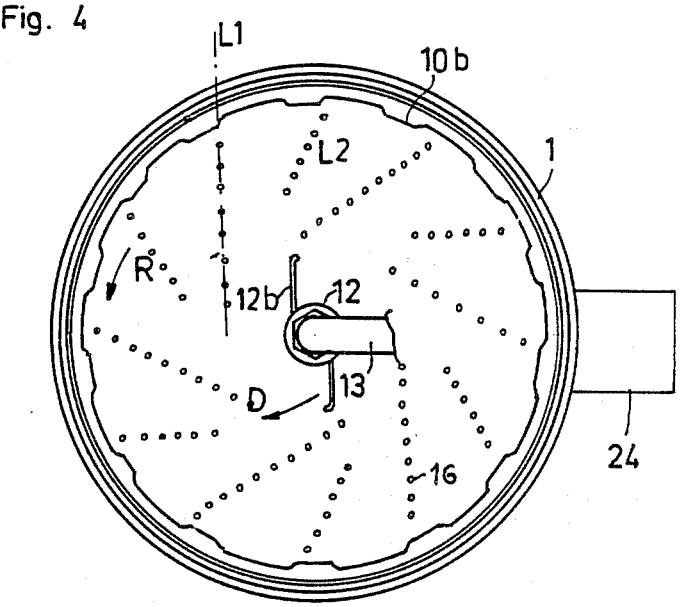
FIG. 4 is a top plan view of the machine.

For each orifice, a guide fin 12b radially extends the distributor 12 for diffusing the liquid in a preferred direction D opposite to the direction of rotation R of the disk as schematically indicated in FIG. 4. To that end, the fins curve in a direction opposite to that of the rotation R.

Beyond its circumferential edge 10a, the disk 10 provides a passage 15 between the edge and the tank 1 to evacuate wastes and liquid.

Figure 2:
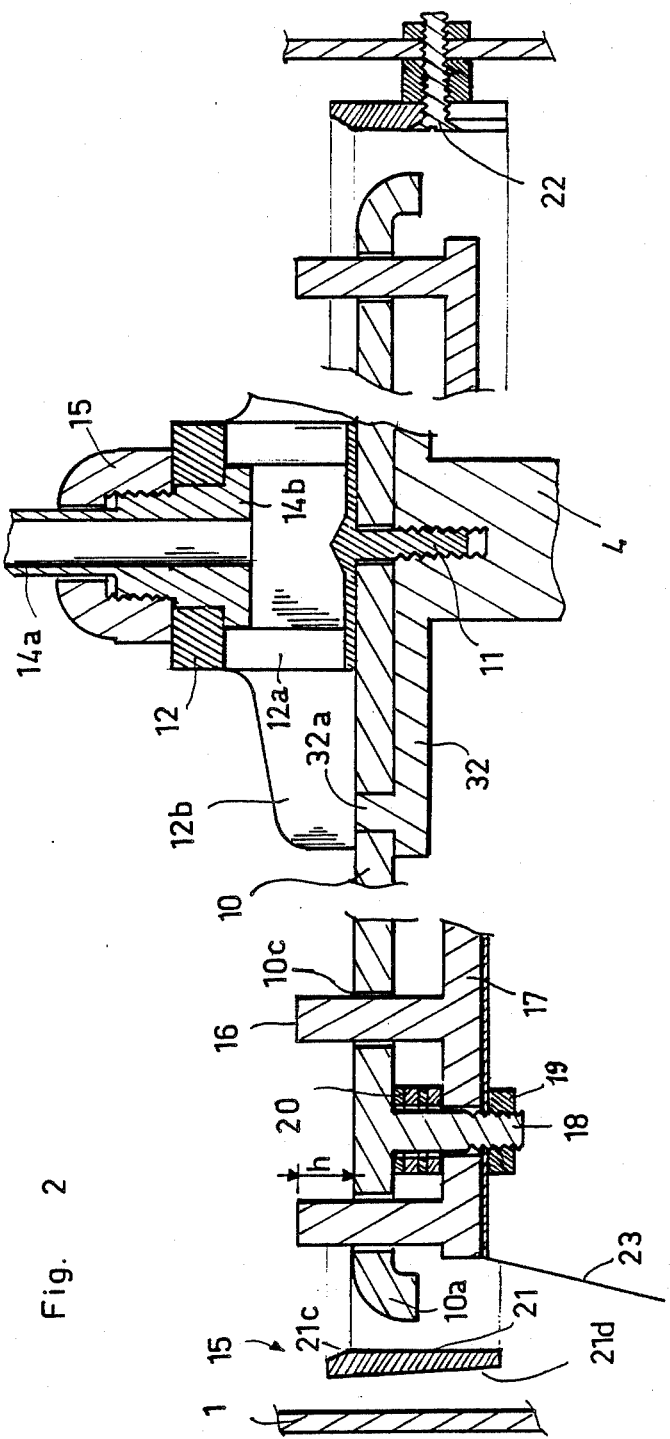
FIG. 2 is a detailed partial sectional view at the rotary disk.

To facilitate the evacuation of the wastes, the disk is provided with a circumferential downward curving edge as shown by 10a in FIG. 2; moreover this edge is circumferentially scalloped as denoted by 10b in FIG. 4.

The disk 10 is provided with a plurality of teeth such as 16 projecting beyond its surface through apertures 10c in it.

The teeth 16 rest in several supports such as 17 which are located below the disk and allow adjusting the height h of these projecting teeth.

In this example, the teeth are distributed along rows L1, L2 . . . as shown in FIG. 4, each row resting on support 17 comprising a strip fixed in place below the disk 10 by a screw 18 and a nut 19. Shims 20 are used in varying numbers to position the strips.

As shown in diagrammatic manner in FIG. 4, the teeth rows L1, L2 . . . are spread around the disk and point in directions which are angularly offset relative to the radial directions, in a direction opposite to the rotation R of the disk 10 so as to impart a spiral motion to the produce.

In this example, longer rows such as L1 (corresponding to longer supports 17) alternate with shorter rows such as L2 (corresponding to shorter supports having fewer teeth).

In the considered case of nut husking, the teeth 16, preferably of one row, are mutually spaced apart by about 2 cm and the number of rows of teeth advantageously is between 8 and 12.

Figure 3:
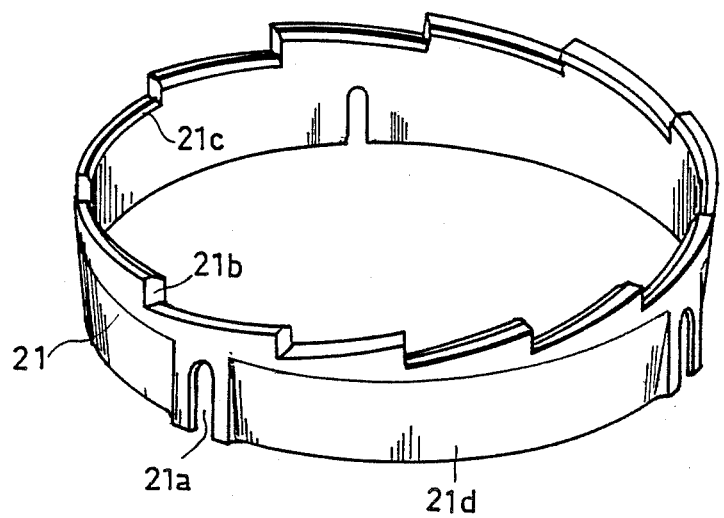
FIG. 3 is a schematic perspective view of one of the components of the machine.

A ring 21 is located in the waste-evacuation passage 15 and is shown in schematic perspective in FIG. 3. This ring is fixed to the tank by three screws such as 22 provided with nuts and housed in clearances 21a of the ring. An outer countersink is present in these clearances so that the flathead screws 22 do not project.

The ring 21 comprises a circumferentially serrated upper side (schematic teeth 21b in FIG. 3) which is bevelled (chamber 21c) on its inner edge pointing toward the disk 10. The ring 21 is so positioned that the base of the teeth 21b is level with the upper side of the disk 10.

Except for the three zones provided with clearances 21a, the ring is thinned at the lower part of its outer cylindrical side (as schematically shown at 21d of FIG. 3).

These design features on one hand enhance the centrifugally induced rising motion of the nuts against the smooth tank wall and on the other hand the elimination of wastes and any leaves or herbs mixed with the processed nuts.

A scraper such as 23 is fastened below one or more supports 17. The dimensions of this scraper are such that it will be flush with the bottom 2 and shall expel during each revolution the wastes toward the spout 3. This scraper can be fastened by a return means using the same screws and nuts (18, 19) fastening the support 17.

With a tank diameter and height respectively of about 57 cm and 65 cm, the above described machine allows husking 40 kg of nuts a minute, that is, to fully clip their green shells; about 45 liters of water are used per minute. Clearly, the machine can be adapted to other produce (fruit, tubers . . . ) by adjusting the rotational speed of the rotary disk and the teeth characteristics (projecting height, possibly their density).

Figure 5:
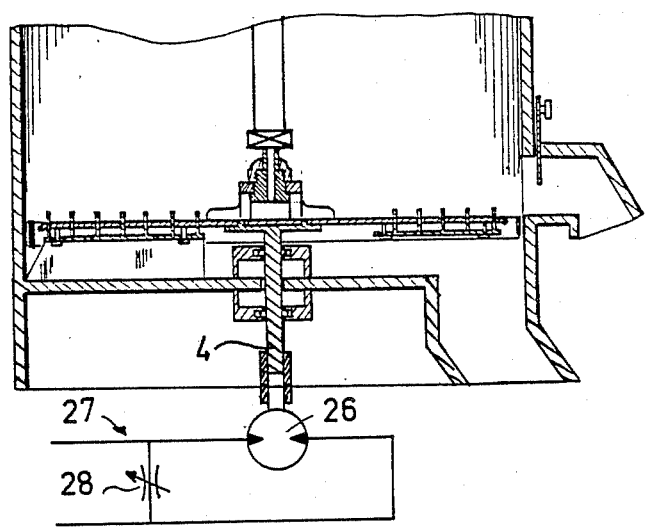
FIGS. 5 and 6 are partial schematic views of variations.

FIG. 5 is a schematic partial section of variation wherein the shaft 4 is driven by a hydraulic motor 26 connected to a hydraulic circuit 27 coupled to a tractor hydraulic takeoff means. An adjustable hydraulic divider 28 controls the rotational speed.

Figure 6:
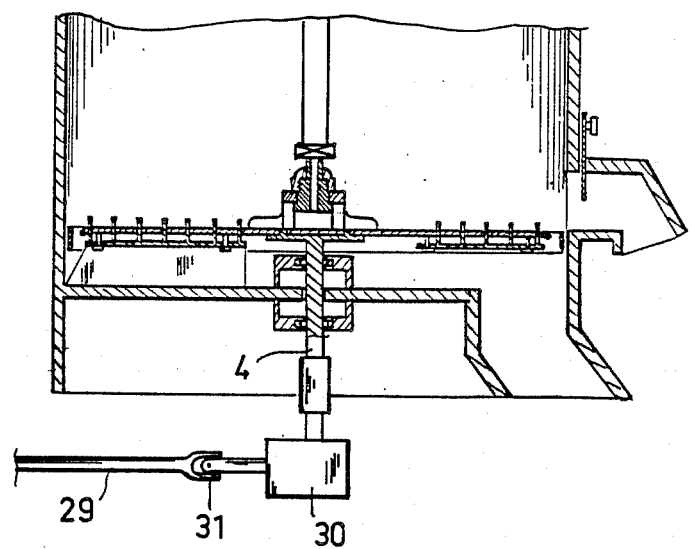

FIG. 6 shows a schematic partial section of another embodiment wherein the shaft 4 is mechanically driven by a homokinetic transmission 29 hooked up to a tractor power takeoff. The transmission includes an angle-transmission casing 30 and a universal joint 31.

I claim:

1. A machine for treating produce for peeling it, comprising a tank (1) having a substantially smooth internal wall, a rotary disk (10) near the bottom thereof, means (4-9) for causing rotation of said disk, means (12, 14) for distributing a liquid in the tank, means (24) for recovering processed produce and means (2, 3, 15) for evacuating wastes and liquid comprising a passage (15) in the periphery of the disk between the edge of the disk and the tank wall, said liquid distributing means comprising a distributor (12) at the center of the disk (10) and provided with orifices (12a) arranged to eject the liquid at the disk in the centrifugal direction, and said rotary disk (10) having a plurality of teeth (16) projecting therefrom.

2. A machine as in claim 1, and wherein said liquid distributor (12) is fastened to the center of the disk (10) so as to rotate together with it and is connected to a liquid intake conduit (13) by a rotary hydraulic joint (14).

3. A machine as in claim 2, and wherein said distributor (12) comprises at least two radial distribution orifices (12a) located above the disk (10) in proximity thereto and, for each orifice, a guide fin (12b) curved in the direction opposite to the direction of the disk rotation (R) for diffusing the liquid in a preferred direction opposite to said direction of rotation.

4. A machine as in claim 2, and wherein said rotary disk (10) is assembled to a central platform (32) by a screw (11) solidly joined to the distributor (12) so that said disk is clamped between said platform and said distributor, the screw (11) being screwed into an axial drive shaft (4) corrected by transmission means (6-8) to motor means (9).

5. A machine as in claim 1, and wherein said teeth (16) are arranged so as to pass through disk apertures (10c) and be adjustable in height, said teeth being supported on adjustment means (17-20) fastened below the disk (10) and fitted to control the projection height of said teeth above the disk.

6. A machine as in claim 5, and wherein said adjustment means for the teeth comprise supports (17) each having a row of teeth (L1, L2 ... ), positioning shims (20) for said supports and means (18, 19) for fastening said supports below the disk (8).

7. A machine as in claim 7, and wherein said rows (L1, L2 ... ) of teeth are distributed across the disk (10) and oriented in directions (D) angularly offset from the radial directions opposite the disk direction of rotation (R) so as to impart a spiraling motion to the produce.

8. A machine as in claim 7, and including longer teeth supports alternating with shorter teeth supports having fewer teeth.

9. A machine as in claim 1, and wherein said means for evacuating wastes and liquid comprises: at least one circular ring (21) fixed to the tank (1) near the rotary disk (10) in the passage (15) between said tank and said disk, a bottom (2) extending over the tank cross-section below the disk (10), and an evacuation spout (3) associated with an opening of said bottom.

10. A machine as in claim 9, and wherein said ring (21) has an upper, circumferential serrated side (21b) which is bevelled (21c) at its inner edge pointing toward the disk (10).

11. A machine as in claim 9, and wherein said the rotary disk (10) has a circumferential downwardly bent edge (10a) and is scalloped (10b) along its circumference to facilitate discharging the wastes.

12. A machine as in claim 9, comprising tooth-supports fastened below the rotary disk, and including at least one scraper (23) fixed on the tooth-supports (17) so as to be flush with the bottom (2).

13. A machine as in claim 1, wherein the produce-recovering means comprises a lateral sliding gate (25) mounted on the tank (1) opposite an opening (1a) in the tank wall and extending above the rotary disk (10).

14. A machine as in claim 1 for husking nuts, wherein the drive means are fitted to drive the rotary disk (10) at a rotational speed between 250 and 400 revolutions per minute.

* * * * *